(12) United States Patent
Mai et al.

(10) Patent No.: US 11,333,606 B2
(45) Date of Patent: May 17, 2022

(54) APPARATUS AND METHOD FOR VISUALLY INSPECTING GEMSTONES

(71) Applicant: Hong Kong Applied Science and Technology Research Institute Co., Ltd., Shatin (HK)

(72) Inventors: Jiangquan Mai, Shatin (HK); Fangyi Shi, Hung Hom (HK); Wai Yi Yeung, Kowloon (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 16/995,931

(22) Filed: Aug. 18, 2020

(65) Prior Publication Data

US 2022/0057327 A1 Feb. 24, 2022

(51) Int. Cl.
*G01N 21/64* (2006.01)
*G01N 21/87* (2006.01)
*G01N 21/59* (2006.01)

(52) U.S. Cl.
CPC ......... *G01N 21/6456* (2013.01); *G01N 21/59* (2013.01); *G01N 21/87* (2013.01); *G01N 2201/02* (2013.01)

(58) Field of Classification Search
CPC .... G01N 21/6456; G01N 21/59; G01N 21/87; G01N 2201/02; G01N 33/381; A44C 17/02
See application file for complete search history.

(56) References Cited

U.S. PATENT DOCUMENTS

| 3,867,032 A | * | 2/1975 | Bruck | G01N 21/87 356/30 |
| 4,529,305 A | | 7/1985 | Welford et al. | |
| 6,874,909 B2 | * | 4/2005 | Vanderschuit | F21S 10/06 362/232 |
| 8,878,145 B1 | * | 11/2014 | Liu | G01N 21/87 250/461.1 |
| 9,188,542 B2 | | 11/2015 | Smith et al. | |
| 9,222,893 B2 | | 12/2015 | Hornabrook et al. | |
| 10,184,896 B2 | | 1/2019 | Yeung et al. | |

(Continued)

FOREIGN PATENT DOCUMENTS

CN 1659581 8/2005
CN 104198456 12/2014

(Continued)

OTHER PUBLICATIONS

International Search Report for International Application No. PCT/CN2020/111721 dated May 18, 2021.

*Primary Examiner* — David P Porta
*Assistant Examiner* — Mamadou Faye
(74) *Attorney, Agent, or Firm* — Warner Norcross + Judd LLP

(57) ABSTRACT

There is disclosed an apparatus for visually inspecting gemstones. The apparatus contains a first light source, a sample stage adapted to receive a gemstone thereon, and a rotating stage located below the sample stage. The rotating stage is adapted to rotate relative to the sample stage. Embodiments of the invention therefore provide a portable and automatic gemstone inspecting apparatus that provides multiple inspection methods centrally without the need to use other external devices.

18 Claims, 5 Drawing Sheets

(56) References Cited

U.S. PATENT DOCUMENTS

| | | | |
|---|---|---|---|
| 2003/0218739 A1 | 11/2003 | Saglimbeni et al. | |
| 2015/0219567 A1* | 8/2015 | Sim | G01N 21/87 356/30 |
| 2016/0161420 A1* | 6/2016 | Zhu | G01N 27/02 374/44 |
| 2016/0178530 A1 | 6/2016 | Davies et al. | |
| 2016/0232432 A1* | 8/2016 | Regev | G06K 9/6202 |
| 2016/0290930 A1* | 10/2016 | Takahashi | G01N 21/87 |
| 2018/0156735 A1 | 6/2018 | Fitch | |

FOREIGN PATENT DOCUMENTS

| | | |
|---|---|---|
| CN | 105593668 | 5/2016 |
| CN | 205262984 | 5/2016 |
| CN | 108027328 | 5/2018 |
| CN | 108709900 | 10/2018 |
| CN | 105548111 | 12/2018 |
| GN | 105352929 | 2/2016 |
| KR | 10-1798078 | 11/2017 |

* cited by examiner

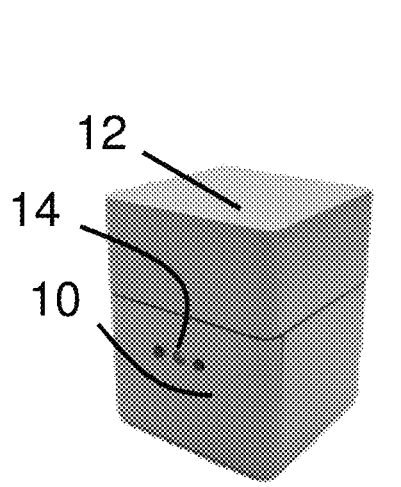
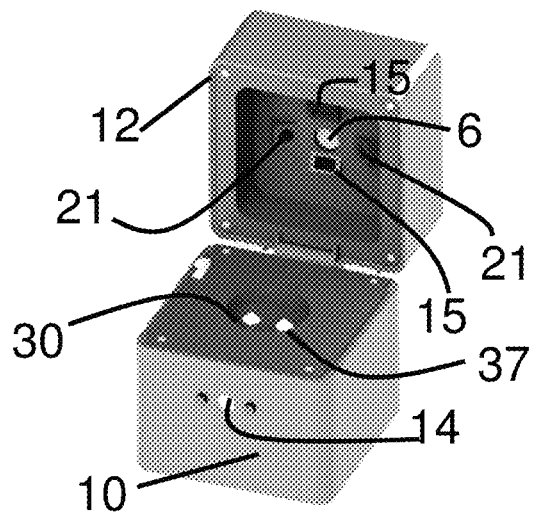
Fig. 1a  Fig. 1b
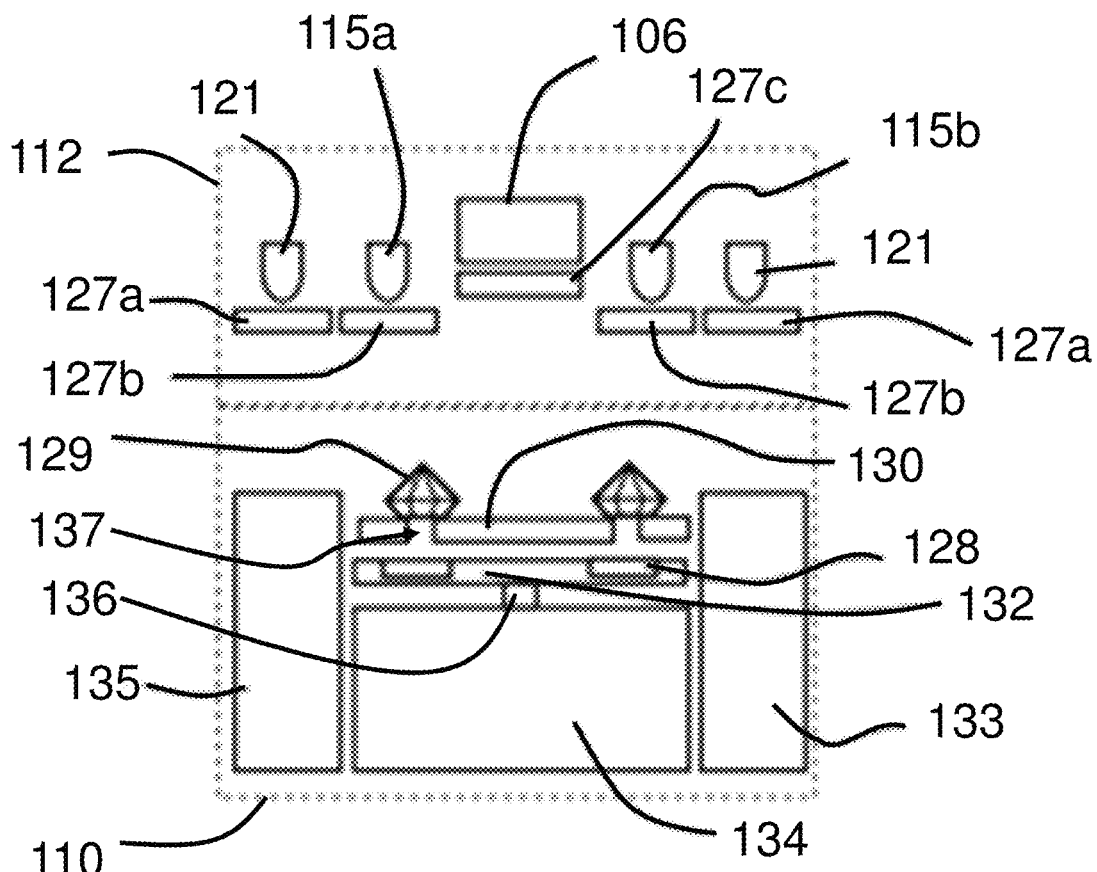
Fig. 2

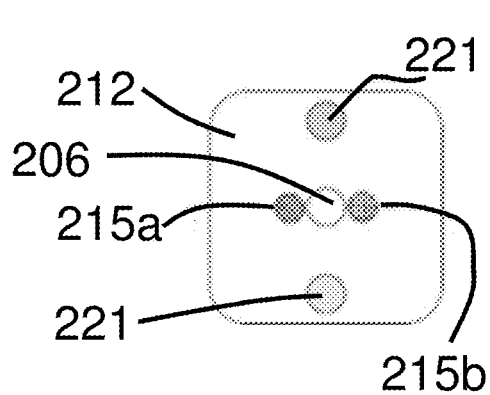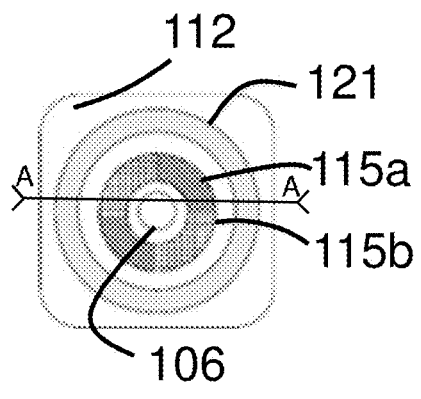
Fig. 3a    Fig. 3b
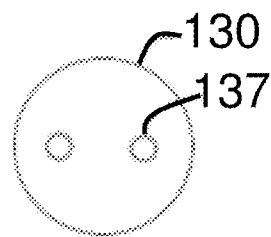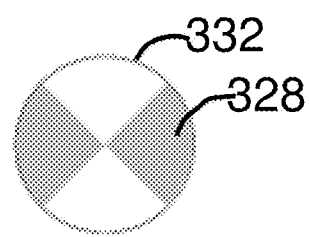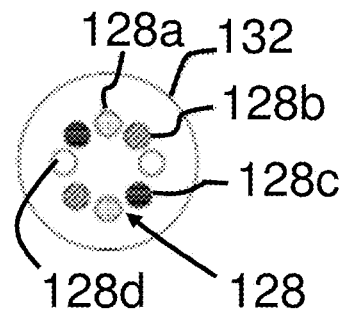
Fig. 4    Fig. 5a    Fig. 5b
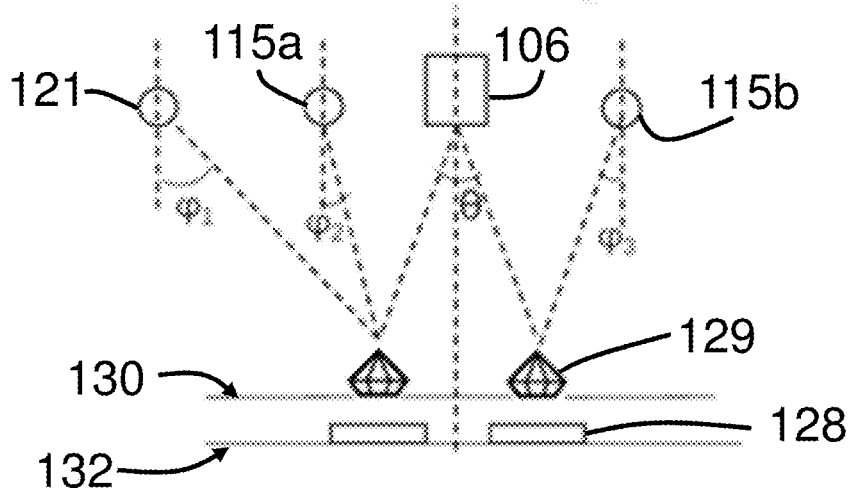
Fig. 6

APPARATUS AND METHOD FOR VISUALLY INSPECTING GEMSTONES

FIELD OF INVENTION

The invention relates to inspection of gemstones, and in particular to the use of light sources for illuminating the gemstones to obtain optical properties of the gemstone for inspection.

BACKGROUND OF INVENTION

Jewelry inspection tools are widely used in analyzing the quality of gemstones, such as to distinguish between natural diamonds and fake diamonds, or between natural diamonds and synthetic diamonds. There are developed many inspection methods for using with jewelry inspection tools based on optical properties of the gemstones, such as white light imaging and ultraviolet (UV) imaging. Because of the optical properties of the synthetic diamonds being different from natural diamonds, and those between fake diamonds and natural diamonds, the various inspection methods would assist a user to obtain images of the diamond under different types of light illuminations, thus to determine if the diamond is fake, synthetic or natural.

However, conventional jewelry inspection tools are bulky and costly, for example when they use microscopes for the user to inspect the gemstones. In addition, conventionally it is very difficult to accurately distinguish a synthetic diamond from a natural diamond, because the physical differences between synthetic and natural diamond is very small, and there are many special and irregular cases. In order to get a reliable inspection result, frequently multiple test methods should be used for validation, but it is extremely difficult to integrate more than one type of inspection methods in a single device, as different inspection methods may need different light sources to generate lights at different wavelengths. Some of the inspection methods are also not static, meaning that the light illuminating the gemstone and/or reflected from the gemstone need to be moving in order to examine the optical properties of the gemstone, which further give rise to difficulties in implementing a single jewelry inspection tool achieving different inspection methods.

SUMMARY OF INVENTION

Accordingly, the invention in one aspect provides an apparatus for visually inspecting gemstones, which contains a first light source, a sample stage adapted to receive a gemstone thereon, and a rotating stage below the sample stage. The rotating stage is adapted to rotate relative to the sample stage.

In some embodiments, the first light source is adapted to emit a light for conducting transmittance imaging of the gemstone.

In some embodiments, the sample stage is formed with a first pinhole to allow the gemstone to be placed thereon. The rotating stage is configured with a plurality of indicators which by the rotation of the rotating stage is adapted to be exposed to the first light source or not exposed to the first light source via the first pinhole.

In some embodiments, the plurality of indicators is each in substantially round shapes, or is each in fan shapes.

In some embodiments, the sample stage is further formed with a second pinhole. The first pinhole and the second pinhole are symmetrically positioned about a rotation axis of the rotating stage. The sample stage is adapted to receive two gemstones on the first pinhole and the second pinhole respectively.

In some embodiments, the rotating stage is adapted to rotate at a rotation angle step of $2\pi/m(n+1)$, wherein m is the number of gemstones on the sample stage, and n is the number of types of the plurality of indicators.

In some embodiments, the first light source is a short-wave UV light source. The apparatus further includes a second light source selected from the following group: a visible light source, and a long-wave UV light source.

In another aspect, the invention provides an apparatus for visually inspecting gemstones, which contains a multiple excitation light source system, and a sample stage adapted to receive a gemstone thereon. The multiple excitation light source system includes a first light source adapted to emit a light for conducting transmittance imaging, and a second light source adapted to emit a visible light.

In some embodiments, the multiple excitation light source system further contains a third light source adapted to emit a light for conducting fluorescence or phosphorescence imaging.

In some embodiments, the first light source is a short-wave UV light source. The second light source is a white light source, and the third light source is a long-wave UV light source.

In some embodiments, the first light source and the second light source define a plane which is substantially parallel to the sample stage. The distance from the first light source to a position on the sample stage that receives the gemstone, is shorter than the distance from the second light source to the position.

In some embodiments, wherein the first light source and the second light source are each in annular shapes, or are each in round shapes.

In some embodiments, the first light source, the second light source and the third light source define a plane which is substantially parallel to the sample stage. The distance from the second light source to a position on the sample stage that receives the gemstone, is shorter than either the distance from the first light source to the position or the distance from the second light source to the position.

In some embodiments, the apparatus further contains a camera positioned substantially in the plane. An incidence angle of the second light source to the gemstone $\varphi 1$ fulfils the relationship of $\theta/2 < \varphi 1 < (\pi/2 - \theta/2)$. An incidence angle of the first light source to the gemstone $\theta 2$ fulfils the relationship of $-\theta/2 < \varphi 2 < \theta/2$. An incidence angle of the third light source to the gemstone $\varphi 3$ fulfils the relationship of $|\varphi 2| \le |\varphi 3|$. Wherein, $\theta$ is a sample view angle of the camera.

According to a further aspect of the invention, there is disclosed a method for visually inspecting gemstones. The method includes the steps of placing a gemstone of a sample stage of an inspection apparatus, using a first light source of the inspection apparatus to conduct a first inspection process to the gemstone, switching to a second light source of the inspection apparatus, and using the second light source to conduct a second inspection process to the gemstone. During the first inspection process and the second inspection process, the gemstone is kept still. One of the first inspection process and the second inspection process is a transmittance imaging process In some embodiments, the first light source and the second light source are controlled by a microprocessor of the inspection apparatus. The inspection apparatus further includes a rotating stage below the sample stage. The sample stage is adapted to receive the gemstone thereon. The rotating stage is rotatable relative to the sample stage. The method further contains a rotating step in which the rotating stage is rotated at an angle step in accordance with the switching step.

In some embodiments, the rotating stage is adapted to rotate at a rotation angle step of $2\pi/m(n+1)$, wherein m is the number of gemstones on the sample stage, and n is the number of types of the plurality of indicators.

In some embodiments, the inspection apparatus further contains a camera adapted to capture an image of the gemstone. The step of using the first light source to conduct a first inspection process, or the step of using the second light source to conduct a second inspection process, further contains a light intensity optimization step based on the image captured by the camera.

In some embodiments, the light intensity optimization step further contains turning a light intensity from the first light source in the case of the first inspection process, or from the second light source in the case of the second inspection process, to a maximum value; and adjusting the light intensity to an optimized value based on an image intensity of the image captured by the camera.

Embodiments of the invention therefore provide a portable and automatic gemstone inspecting apparatus that provides multiple inspection methods integrally without the need to use multiple inspecting apparatus. Some embodiments provide six different inspection methods/processes in a single inspecting apparatus and all these inspections can be completed within a short time (e.g. one minute), which provides more comprehensive information for natural/synthetic/fake diamond inspection. Also, the multiple inspection methods enable a capability to distinguish multiple types of gemstones, and reducing the false result caused by special or irregular cases. The multiple inspection methods can be selected by the user manually to run one after another, or in some embodiments, the Microprogrammed Control Unit (MCU) controls the multiple excitation light source system automatically to perform all of the required inspection processes, together with automated light switching and intensity control, thus removing the need for the user to intervene in the inspection process at all. It is also possible for a same inspecting apparatus to perform both fluorescence and transmittance imaging according to embodiments of the invention. The MCU could also control rotating mechanisms in the apparatus, such as the turntable for UV transmittance imaging in the sample stage, so that transmittance imaging detection can be carried out automatically. The user of the inspecting apparatus as such requires no special training about gemstone inspection techniques.

With the compact size of the inspecting apparatus in some embodiments, such an inspecting apparatus is particularly useful for "on-the-go" purposes such as for retailers and ordinary consumers in jewelry shops, for parties in secondhand jewelry transactions, and for consumers in jewelry exhibitions. The macro imaging system in the apparatus helps reduce the imaging distance (e.g. within 30 mm distance), thus making the compact size possible. With the battery installed in the inspecting apparatus according to certain embodiments, there is nothing needed to connect to the inspecting apparatus, and the user could conveniently put the gemstones inside the apparatus and start the inspection process immediately.

The inspecting apparatus according to some embodiments also has good connectivity to external computing devices for post-processing of the inspected image data. In particular, the apparatus connects to a mobile phone or tablet using USB port, Bluetooth, or Wi-Fi to upload the captured images of the gemstone to the mobile phone or tablet for further analysis, such as comparing the images with reference images in a database, and providing a rating as to the authenticity of gemstones to the user. Videos can also be captured for the inspection process and exported to external devices. The user does not need to transfer data in any restrictive environments such as where a desktop computer must be available. Rather, all the inspection processes and the data analysis can be carried out on the go, and the analysis can be done on a mobile phone, with the final results immediately provided to the user.

The foregoing summary is neither intended to define the invention of the application, which is measured by the claims, nor is it intended to be limiting as to the scope of the invention in any way.

BRIEF DESCRIPTION OF FIGURES

The foregoing and further features of the invention will be apparent from the following description of embodiments which are provided by way of example only in connection with the accompanying figures, of which:

FIGS. 1a and 1b are the appearances of a portable gemstone inspecting apparatus in its closed status, and its opened status respectively, according to an embodiment of the invention.

FIG. 2 shows the cross-sectional view of the internal structure of a gemstone inspecting apparatus according to another embodiment.

FIG. 3b is a planar view of the light source system in the inspecting apparatus of FIG. 2.

FIG. 3a is a planar view of the light source system according to an alternative embodiment.

FIG. 4 is the top view of the rotating stage in the apparatus of FIG. 2.

FIG. 5b is the top view of the sample stage in the apparatus of FIG. 2.

FIG. 5a is the top view of the sample stage according to an alternative embodiment.

FIG. 6 is the illustration of incident angles of each light source in the apparatus of FIG. 2.

In the drawings, like numerals indicate like parts throughout the several embodiments described herein.

DETAILED DESCRIPTION OF THE PREFERRED EMBODIMENTS

Figure 7:
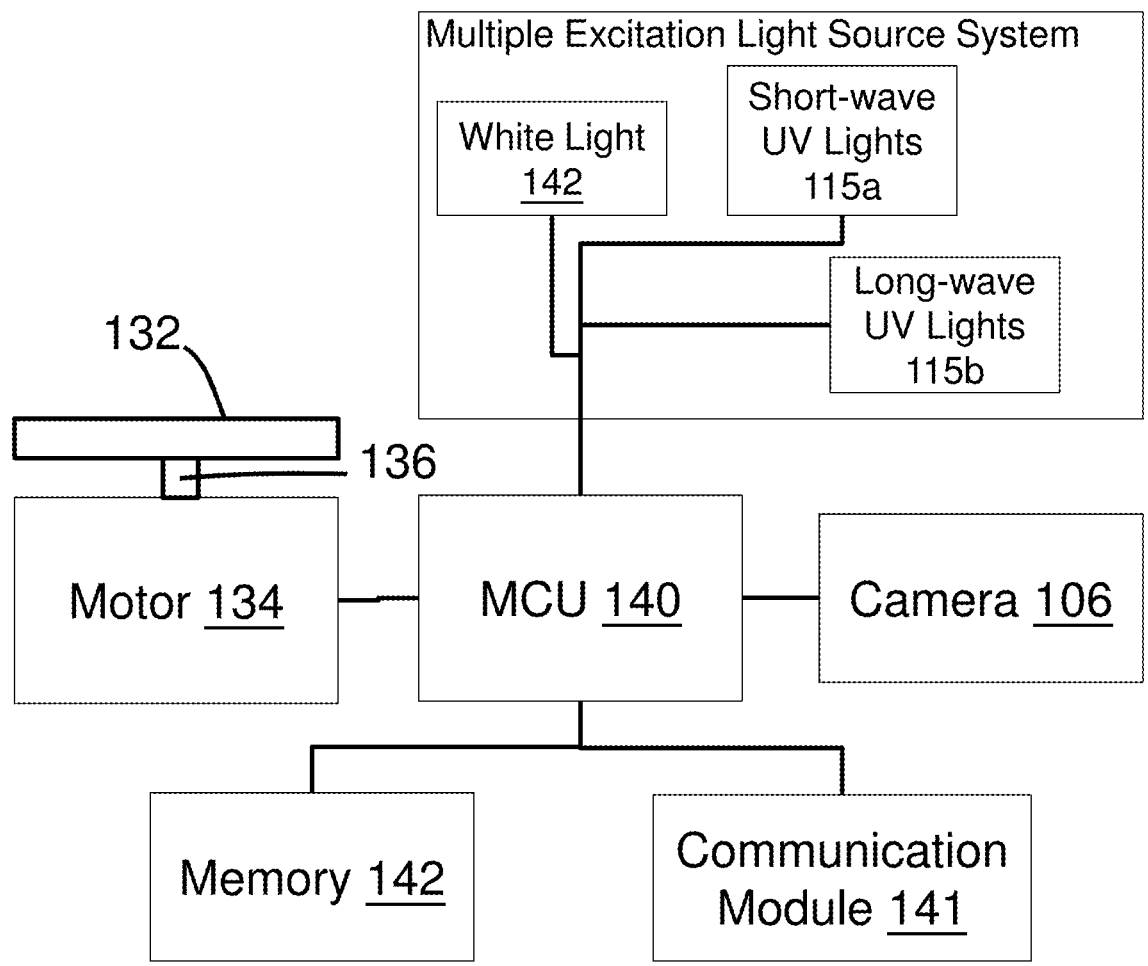
FIG. 7 is a system schematic diagram of the inspecting apparatus of FIG. 2.

As used herein the term "diamond" specifies one of many of the members of the group of minerals known as gemstones. These can be industrial or jewelry grade stones and it is to be understood that the term "diamond" as used herein, can be replaced with sapphire, ruby, tanzanite, emerald, and any other of a host of metal oxide stones.

As used herein the term "transmittance imaging" refers to any imaging methods utilizing transmittance property of gemstones in which the image of the gemstone formed by light transmitted through the gemstone is captured. The light used for transmittance imaging includes but not limited to short-wave UV light, long-wave UV light and visible light. An example of the short-wave UV light has the wavelength of 200 to 280 nm, and an example of the long-wave UV light has the wavelength of 315 to 400 nm.

Referring now to FIGS. 1a and 1b, the first embodiment of the invention is a portable gemstone inspecting apparatus that generally resembles the appearance of a cubic jewelry box. The inspecting apparatus has a lid 12 pivotally connected to a box body 10, where the lid 12 can be moved to close the inspecting apparatus as shown in FIG. 1a, or the lid 12 can be moved to expose components for inspecting the gemstone as shown in FIG. 1b. On the exterior side wall of the box body 10, there are configured multiple light indicators 14 to notify users of the operation status of the inspecting apparatus. As shown in FIG. 1b, a middle light indicator 14 is on when the lid 12 is opened. The inspecting apparatus operates on a battery power supplied by an embedded rechargeable battery (not shown). Also, there is at least one communication module (not shown) equipped in the inspecting apparatus. Such communication module for example can be a Bluetooth module, a Wi-Fi transceiver, or a USB adapter.

As illustrated in FIG. 1b, on a top face of the box body 10 there is a provided a sample stage 30 on which one or more gemstones to be inspected may be put by the user. There are two pinholes 37 formed on the sample stage 30, each corresponding to one gemstone, and this means that up to two gemstones can be put on the sample stage 30 for proper inspection at the same time. Above the sample stage 30, at the bottom side of the lid 12 there are provided a multiple excitation light source system including two UV lights 15 (a short-wave light and a long-wave light respectively), and two white lights 21. The two UV lights 15 are symmetrically positioned around a camera 6 at the center of the bottom face of the lid 12, and the two white lights 21 are also symmetrically positioned around the camera 6. On the other hand, the two UV lights 15 and the two white lights 21 are spaced from each other at a 90° angular distance, thus forming a cross shape. The white lights 21 are used as visual light sources in the inspecting apparatus to conduct visual light imaging. In particular, The white lights 21 are for imaging the color, size, cutting and clarity of gemstones.

Turning to FIGS. 2, 3b, 4, 5b and 6, another embodiment of the invention is a gemstone inspecting apparatus with its internal structure shown in FIG. 2. Similar to that in FIGS. 1a-1b, the inspecting apparatus in FIG. 2 also has a cubic appearance and contains a lid 112 as well as a box body 110. The lid 112 contains a multiple excitation light source system including two short-wave UV lights 115a, two long-wave UV lights 115b, and a white light 121. As shown in FIG. 3b, from a bottom view of the lid 112 the white light 121 has an annular shape, which is located most radially outward compared to UV lights 115a, 115b and the camera 106. The white light 121 appears as two independent light sources in the cross-sectional view of FIG. 2, which is depicted along the line A-A in FIG. 3b. Next, radially inward of the white light 121 are the two short-wave UV lights 115a and the two long-wave UV lights 115b together forming an annular shape. Each of the long-wave UV lights 115b and short-wave UV lights 115a is in an arc shape spanning a 90° angular range. In addition, while not shown in FIG. 3b, in FIG. 2 it is illustrated that for each of the light sources as well as the camera 116, there are other optical components configured. In particular, for the white light 121 a diffuser 127a is placed in front thereof so that light emitted by the white light 121 toward the sample stage 130 will be diffused. For the long-wave UV lights 115b and the short-wave UV lights 115a, Ultraviolet Short Pass (UVSP) filters 127b are configured in front thereof. Lastly, for the camera 116, an Ultraviolet Long Pass (UVLP) filter 127c is configured in front thereof. The diffuser 127a, the UVSP filters 127b and the UVLP filter 127c all have shapes and sizes corresponding to their associated light sources.

Turning to the box body 110. As mentioned above there is sample stage 130 provided in the box body 110 for placing the gemstones 129 to be inspected, which are diamonds as shown in FIG. 2 for the sake of describing this embodiment. The sample stage 130 has a round shape, and is located at an upper portion of the box body 110 and exposed to the user when the lid 112 is opened. The sample stage 130 is kept still in this embodiment so that the positions of the gemstones 129 once placed on the sample stage 130 remain unchanged at any time. The sample stage 130 is formed with two pinholes 137 that are symmetrically positioned around a center of the sample stage 130, as best seen in FIG. 4. By rotation of the rotating stage 132, indicators 128 on the top surface of the rotating stage 132 is exposed to the light sources or not exposed to the light sources via the pinholes 137.

The gemstones 129 should be placed each at a pinhole 137 so that transmittance imaging of the gemstones 129 can be conducted, as the light can pass through the gemstone 129 and the underlying pinhole 137 to a rotating stage 132, which is a turntable connected to a motor 134 via a shaft 136. The turntable is rotatable relative to the sample stage 130 and on its surface there are multiple indicators 128 for the purpose of transmittance imaging, as best seen in FIG. 5b. Each of the indicators 128 has a round shape which is solid, and there are in total eight such indicators 128a-128d symmetrically located around a center (not shown) of the turntable 132 so that they together form the shape of a circle. Among the eight indicators, there are four pairs where the indicators of each pair are located on a diameter of the rotating stage 132, three of the pairs being UV indicators 128a, 128b and 128c. The UV indicators are made from UV fluorescence dye or other materials that will emit visible light under specific UV light. The three pairs of UV indicators 128a, 128b and 128c are made from different materials (thus indicated using different patterns in FIG. 5b) so that they can be used for distinguishing different spectral gemstones. A fourth pair is indicators 128d is not made of UV-specific materials like the other three pairs, so the fourth pair is used in inspection processes other than transmittance imaging The indicators 128a-128d provide visual indications when light transmitted through the gemstones 129 reaches, and then is reflected or excite visible fluorescence light from the indicators 128a-128d, and the light from the indicators 128a-128d is then captured by the camera 106 thus resulting in the transmittance imaging.

FIG. 6 is an illustration of the spatial relationships between the various components described above. In particular, the camera 106 is located at the center of the multiple excitation light source system, with a short-wave UV light 115a and a long-wave UV light 115b located equidistantly on two sides of the camera 106. The white light 121 is located further radially outward from the camera 106 as compared to the short-wave UV light 115a and the long-wave UV light 115b in FIG. 6. Note that FIG. 6 is a cross-sectional view similar to FIG. 2, so the individual symbols for representing the short-wave UV light 115a, the long-wave UV light 115b and the white light 121 do not mean that these light sources have ball or dot shapes. Rather, they have the shapes as shown in FIG. 3b. For the white light 121, it is shown only on one side of the camera 106 in FIG. 6 and the segment of the white light 121 on another side of the camera 106 is omitted for simplicity. In FIG. 6, the white light 121, the short-wave UV light 115*a*, the long-wave UV light 115*b* and the camera 106 define a plane (not shown) which is substantially parallel to the sample stage 130. The distance from the short-wave UV light 115*a* to a position on the sample stage 130 that receives a gemstone 129 (the left one in FIG. 6), is shorter than the distance from the white light 121 (on the same side of the camera 106 as the short-wave UV light 115*a*) to the position. Likewise, the distance from the long-wave UV light 115*b* to a position on the sample stage 130 that receives a gemstone 129 (the right one in FIG. 6), is shorter than the distance from the white light (on the same side of the camera 106 as the long-wave UV light 115*b*) to the position.

In addition, in FIG. 6 some angles related to the gemstones 129, the light sources, and the camera 106 are defined. An incidence angle of the white light 121 to a corresponding gemstone 129 (the left one in FIG. 6) φ1 fulfils the relationship of $\theta/2<\varphi1<(\pi/2-\theta/2)$, wherein θ is a sample view angle of the camera 106. An incidence angle of the short-wave UV light 115*a* to a corresponding gemstone 129 (the left one in FIG. 6) φ2 fulfills the relationship of $-\theta/2<\varphi2<\theta/2$. An incidence angle of the long-wave UV light 115*b* to a corresponding gemstone 129 (the right one in FIG. 6) φ3 fulfills the relationship of $|\varphi2|\leq|\varphi3|$. One can see that the white light 121 therefore has a higher incidence angle compared to both the short-wave UV light 115*a* and the long-wave UV light 115*b*. In one example, the camera viewing angle θ for the gemstones 129 is 40°. The incidence angle φ1 of white light 121 is preferred to be $70°<\varphi1<90°$. The incidence angle of the short-wave UV light 115*a* is preferred to be $-20°<\varphi2<20°$, and the incidence angle of the long-wave UV light 115*b* is preferred to be $-20°<\varphi3<20°$, and φ3 is preferred to be larger than φ2.

Turning to FIG. 7, the system schematic diagram of the electronic components of the inspecting apparatus of FIGS. 2, 3*b*, 4, 5*b* and 6 is shown. There is a MCU 140 as the controller for all components in the apparatus, and the MCU 140 is connected to a memory 142, a communication module 141, the motor 134, the camera 106, and the light sources in the multiple excitation light source system including the white light 121, the short-wave UV lights 115*a* and the long-wave UV lights 115*b*. Although not shown, all the components above are powered by the battery in the inspecting apparatus. The MCU 140 controls the different light sources, the camera 106 and the motor 134 (which in turns drives the rotating stage 132) to perform the automatic gemstone inspection processes as will be described in detail below. The memory 142 is used to store any data to be processed from the camera 106, or any data that has been processed by the MCU 140. The communication module 141 as mentioned above can be a Bluetooth module, a Wi-Fi transceiver, or a USB adapter, and is used to establish data communication between the inspecting apparatus and an external computing device (not shown).

Figure 8:
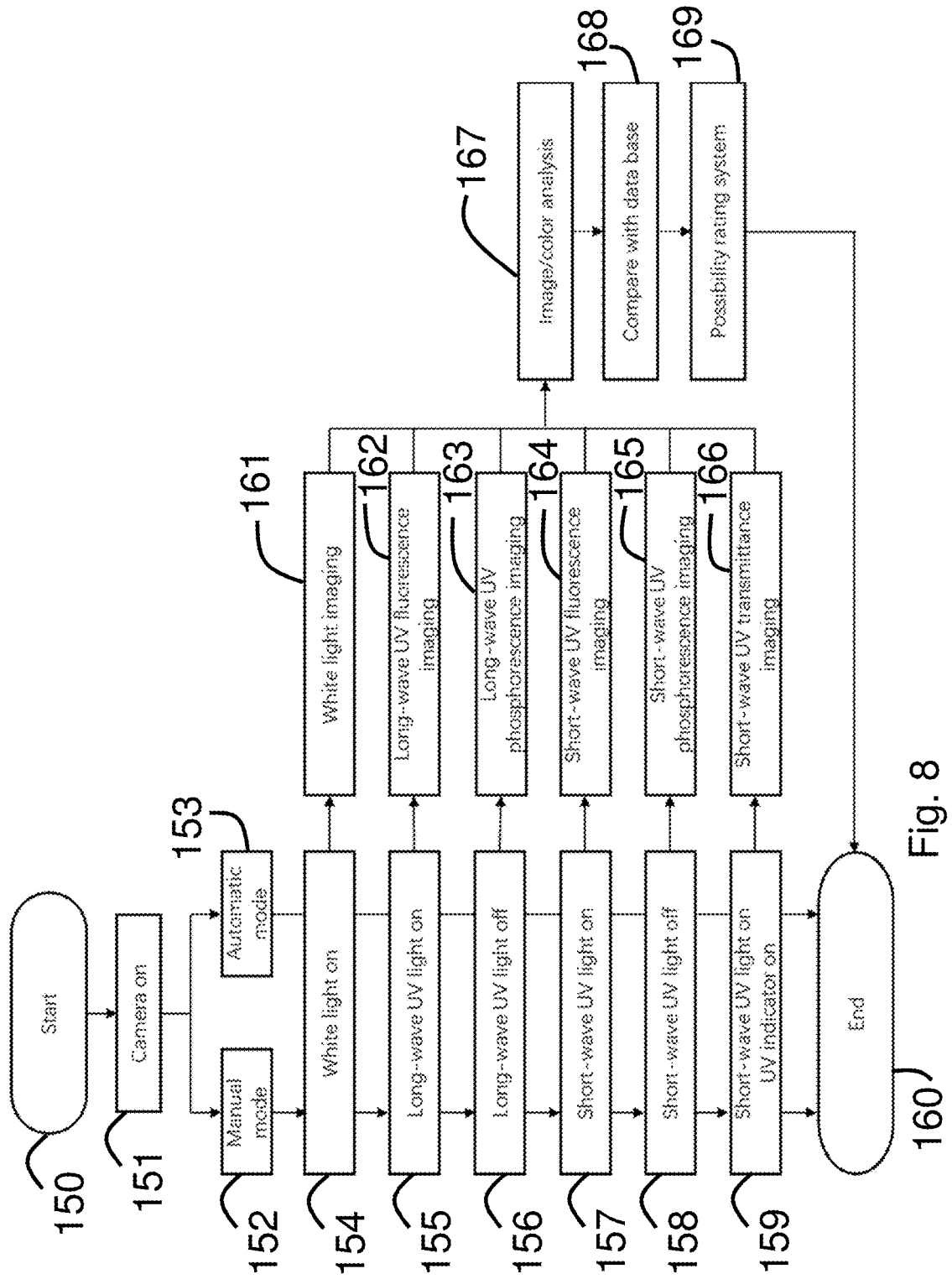
FIG. 8 is a flow chart showing the work flow of the inspecting apparatus of FIG. 2.

FIG. 8 is a flow chart showing the complete process of gemstone inspection by the inspecting apparatus in FIGS. 2, 3*b*, 4, 5*b*, 6 and 7. It should be noted that the inspecting apparatus may work with different operation methods different from the one shown in FIG. 8, for example with less than six inspection methods, and equally the method in FIG. 8 may be applied to other inspecting apparatus of the invention. For the sake of description, the following descriptions will be made with references to part numbers in FIGS. 2, 3*b*, 4, 5*b*, 6 and 7.

The method starts at Step 150 in which the user make necessary preparations including putting one or more gemstones 129 to be inspected on the sample stage 130. The one or more gemstones 129 should be put on at the positions of the pinholes 137 to ensure that the various inspection methods can be carried out accurately. The user should also power on the inspecting device. Next, in Step 151 the user turns on the camera 106 for example by actuating a switch (not shown) on the housing of the inspecting apparatus. The user then needs to select whether to perform the various inspection methods automatically (which means that no user intervention is required during each inspection method and between these inspection methods) in Step 153, or to perform the various inspection methods manually (which means that the user has to start each inspection method individually) in Step 152. Either way, in the example of FIG. 8, the user first conducts the white light imaging in which the white light 121 is turned on (as controlled by the MCU 140) in Step 154. The white light emitted by the white light 121 and diffused by the diffuser 127*a* then illustrates the gemstone 129, the image of which is then captured by the camera 106 in Step 161. Additionally, the camera 106 may also capture a video of the gemstone 129 during the inspection. The white light image is then sent by the inspecting apparatus to the external computing device which has an established connection with the inspecting apparatus. The external computing device in Step 167 conduct an image/color analysis on the white light image, in Step 168 compare the analysis result with reference data in its database, and in Step 169 provide a rating on the possibility of whether the gemstone 129 is a natural, or a fake/synthetic gemstone. The final rating is exhibited to the user on a display of the external computing device. Until now, the white light inspection process is completed. It should be note that in the white light inspection, the rotating stage 130 is not driven to rotate because no transmittance is analyzed in this process.

The method then goes back to Step 155 to turn off the white light 121, and turn on the long-wave UV lights 115*b*. Then, the long-wave UV fluorescence imaging is conducted in Step 162, and the resultant image is analyzed and reported to the user in Step 167-169. Similar inspection processes are repeated five times after the white light imaging (with different detailed operations like light operation, physical mechanism, etc. though), following the order of long-wave UV fluorescence imaging (Steps 155 and 162, using the long-wave UV lights 115*b*), long-wave UV phosphorescence imaging (Steps 156 and 163), short-wave UV fluorescence imaging (Steps 157 and 164, using the short-wave UV lights 115*a*), short-wave UV phosphorescence imaging (Steps 158 and 165), and lastly short-wave UV transmittance imaging (Steps 159 and 166, using the short-wave UV lights 115*a*). In each transition from one inspection process to a next one, the previous light source is turned off, and either the next light source is turned on, or there is no light source turned on in the next process. In particular, in the long-wave UV phosphorescence imaging process (Steps 156 and 163), the long-wave UV lights 115*b* used in the previous long-wave UV fluorescence imaging process need to be turned off. In Steps 155 and 162 the long-wave UV lights 115*b* are on so the user can see the fluorescence light of the gemstone 129 that is being was excited. Then, with the ending of Step 155 the MCU 140 suddenly turns off the long-wave UV lights 115*b* as the method gets it gets to the Step 156. For the purpose of long-wave UV phosphorescence imaging, some synthetic diamonds will still emit light which is called phosphorescence after UV light sources are turned off. The short-wave UV phosphorescence imaging process (Steps 158 and 165) is similar to the long-wave UV phosphorescence imaging process in the switching sequence. In summary, all these light sources turning off and on are controlled by the MCU 140, therefore achieving automatic switching of the light sources. The MCU 140 controls automatic light source switching, and also conducts light intensity control to minimize the transition time between each inspection process, so that high quality images (in particular photoluminescence images) can be obtained.

For each light source switching, the light intensity of the new light source will first turn to its maximum value, and then adjust to an optimized level, which can be completed as quickly as within a second. The MCU 140 controls the light intensity by controlling the ON/OFF ratio of the light source in a period (that is, the duty ratio), which averages the light source power. By increasing or decreasing the duty ratio, the energy flows the light source can be controlled precisely. The MCU 140 reads back the camera image intensity in each inspection process to adjust the power at an optimized level for image/color analysis in Step 167. It forms a closed-loop analysis system. Then according to the comparison of the camera image and the existing database in Step 168, it can further optimize the intensity to facilitate the accurate inspection. The light intensity adjustment depends on the camera image intensity from coarse adjustment (decrease) ON/OFF ratio to a narrow hysteresis loop and then change to fine adjustment (increase/decrease) ON/OFF ratio to the optimized level. For example, the adjustment of light intensity for the coarse step is 10% and it for the fine step is 1%. In this way the MCU 140 quickly & precisely controls the energy flow through the light sources with a resolution of 1%.

At all time, the sample stage 130 is fixed and the gemstones 129 are also kept still during all six inspection processes. It should be noted that only in the last inspection process, which is the short-wave UV transmittance imaging in Steps 159 and 166, the rotating stage 132 will rotate relative to the sample stage 130. This is because the indicators 128a-128c need to move in the visual field of the camera 106 and also be exposed under the short-wave UV light 115a in order to generate transmittance images which are formed by light transmitted through the gemstone 129, hit, and reflected from the indicators 128a-128c. The rotating stage 132 is rotated at an angle step in accordance with the switching step (i.e. the frequency of light source switching). As a general rule, the rotating stage 132 during step 166 rotates at a rotation angle step of $2\pi/m(n+1)$, wherein m is the number of gemstones on the sample stage, and n is the number of types of the plurality of indicators. For the inspecting apparatus illustrated in FIGS. 2, 3b, 4, 5b, 6 and 7, m=2 and n=3. When the short-wave UV transmittance imaging is completed, then the rotating stage 132 automatically rotates back to its original position (i.e. with indicators 128d be positioned under the pinholes 137) and then stops rotating. This stop position is also the default position for the rotating stage 132 because the indicators 128d as mentioned above are used in inspection processes other than the transmittance imaging, so when the rotating stage 132 is not rotating the indicators 128d are aligned with the pinholes 137.

With all the six inspection processes completed in FIG. 6, six corresponding possibility ratings are also provided to the user by the external computing device. The user is thus provided with an accurate inspection to the gemstone 129 for many different optical properties thereof. If two gemstones 129 are placed on the sample stage 130 at the same time, then the above steps 154-169 are performed simultaneously for the two gemstones 129, and final ratings are provided individually for the two gemstones 129.

FIG. 3a shows an alternative multiple excitation light source system that can be used in the inspecting apparatus according to another embodiment. Instead of forming annular shapes, the light sources in FIG. 3a are now discrete light sources in dot shapes in the bottom view. The camera 206 is still placed at the center of the bottom face of the lid 212. A short-wave UV light 215a and a long-wave UV light 215b are respectively located on two sides of the camera 206, and the three are in a line. On the other sides, two white lights 221 are also symmetrically positioned around the camera 206. The two UV lights 215a and 215b, and the two white lights 211 are spaced from each other at a 90° angular distance, thus forming a cross shape.

FIG. 5a shows an alternative rotating stage that can be used in the inspecting apparatus according to another embodiment. Instead of having multiple round-shaped indicators on the surface that form a circle, in the rotating stage 332 in FIG. 5a, the UV indicators 328 each comes in a fan shape spanning 90°, and they are symmetrical around the center of the rotating stage 332.

Figure 9:
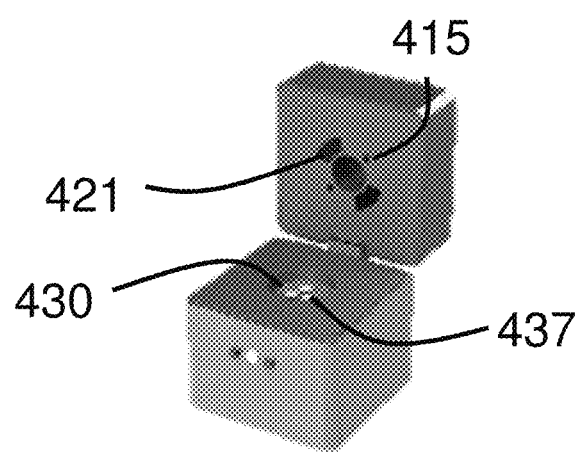
FIG. 9 shows the appearance of an inspecting apparatus according to another embodiment.

FIG. 9 shows the appearance of another inspecting apparatus when it is opened, according to an embodiment. Compared to the one shown in FIG. 1b, the major difference in the apparatus in FIG. 9 is that there are three pinholes 437 arranged symmetrically on the sample stage 430 around a center thereof. This means that up to three gemstones (not shown) can be put on the sample stage 430 at the same time while proper inspections can be carried out. Also, the shapes of the light sources including the white lights 421 and the UV lights 415 are different from those in FIG. 1b.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the embodiments described above in FIG. 8, six different inspection processes are carried for a same gemstone. However, those skilled in the art should understand that depends on the type of gemstone to be analyzed, there may be more and less inspection processes carried out. For example, Spinel or Quartz requires less inspection processes than natural diamonds. The inspecting apparatus in this case only needs to perform automatically some of the six inspection processes mentioned above.

In the embodiments described above, the sample stage of the inspecting apparatus is still while the rotating stage is rotatable. However, one skilled in the art would realize that in variations of the embodiments, the sample stage can be rotatable too, as long as there is relative rotation between the sample stage and the rotating stage in order to enable the transmittance imaging to be carried out. The location of the gemstone on the sample stage could also be changed, e.g. to the center of the sample stage. On the other hand, the rotating stage besides being rotatable could also be a liftable translation stage.

The various light sources in the multiple excitation light source system as shown in FIGS. 2 and 6 are parallel to the camera center axis. However, in other variations, one or more of the light sources may also be configured to tilt as respect to the camera center axis.

The structure of the sample stage could also be modified. Besides the shape shown in the embodiments that is suitable for gemstones, other shapes and structures of the sample stage are also possible for example by adapting to a ring, a necklace or other jewelries in different form factors.

In the embodiments shown in FIGS. 2 and 6, all the light sources as well as the camera are shown to be substantially located in a same plane that is parallel to the sample stage. However, those skilled in the art should realize that the above components are not necessarily in the same plane. For example, the white lights could keep the high incidence angle, but in a lower position than the UV lights.

What is claimed is:

1. An apparatus for visually inspecting gemstones, comprising:
    a first light source adapted to emit a light for conducting transmittance imaging of the gemstone; and
    a sample stage adapted to receive a gemstone thereon; and
    a rotating stage below the sample stage and adapted to rotate relative to the sample stage;
    wherein the sample stage is formed with a first pinhole to allow the gemstone to be placed thereon; the rotating stage configured with a plurality of indicators which by the rotation of the rotating stage is adapted to be exposed to the first light source or not exposed to the first light source via the first pinhole.

2. The apparatus of claim 1, wherein the plurality of indicators are each in substantially round shapes, or are each in fan shapes.

3. The apparatus of claim 1, wherein the sample stage is further formed with a second pinhole; the first pinhole and the second pinhole being symmetrically positioned about a rotation axis of the rotating stage; the sample stage adapted to receive two gemstones on the first pinhole and the second pinhole respectively.

4. The apparatus of claim 1, wherein the rotating stage is adapted to rotate at a rotation angle step of $2\pi/m(n+1)$, wherein m is the number of gemstones on the sample stage, and n is the number of types of the plurality of indicators.

5. The apparatus of claim 1, wherein the first light source is a short-wave UV light source; the apparatus further comprising a second light source selected from the following group:
    a visible light source; and
    a long-wave UV light source.

6. The apparatus of claim 1,
    further comprising a second light source adapted to emit a visible light to the gemstone.

7. The apparatus of claim 6, further comprises a third light source adapted to emit a light for conducting fluorescence or phosphorescence imaging of the gemstone.

8. The apparatus of claim 7, wherein the first light source is a short-wave UV light source; the second light source is a white light source; and the third light source is a long-wave UV light source.

9. The apparatus of claim 6, wherein the first light source and the second light source define a plane which is substantially parallel to the sample stage; the distance from the first light source to a position on the sample stage that receives the gemstone, is shorter than the distance from the second light source to the position.

10. The apparatus of claim 9, wherein the first light source and the second light source are each in annular shapes, or are each in round shapes.

11. The apparatus of claim 7, wherein the first light source, the second light source and the third light source define a plane which is substantially parallel to the sample stage; the distance from the second light source to a position on the sample stage that receives the gemstone, is shorter than either the distance from the first light source to the position or the distance from the second light source to the position.

12. The apparatus of claim 11, further comprises a camera positioned substantially in the plane; wherein an incidence angle of the second light source to the gemstone $\varphi 1$ fulfils the relationship of $\theta/2<\varphi 1<(\pi/2-\theta/2)$; an incidence angle of the first light source to the gemstone $\varphi 2$ fulfilling the relationship of $-\theta/2<\varphi 2<\theta/2$; an incidence angle of the third light source to the gemstone $\varphi 3$ fulfilling the relationship of $|\varphi 2|\leq|\varphi 3|$; wherein, $\theta$ is a sample view angle of the camera.

13. A method for visually inspecting gemstones, comprising the steps of:
    placing a gemstone of a sample stage of an inspection apparatus;
    using a first light source of the inspection apparatus to conduct a first inspection process to the gemstone;
    switching to a second light source of the inspection apparatus; and
    using the second light source to conduct a second inspection process to the gemstone;
    wherein during the first inspection process and the second inspection process, the gemstone is kept still; one of the first inspection process and the second inspection process being a transmittance imaging process;
    wherein the first light source and the second light source are controlled by a microprocessor of the inspection apparatus; the inspection apparatus further comprising a rotating stage below the sample stage; the sample stage adapted to receive the gemstone thereon; the rotating stage adapted to rotate relative to the sample stage;
    wherein the method further comprises a rotating step in which the rotating stage is rotated at an angle step in accordance with the switching step;
    wherein the sample stage is formed with a first pinhole to allow the gemstone to be placed thereon; the rotating stage configured with a plurality of indicators which by the rotation of the rotating stage is adapted to be exposed to the first light source or not exposed to the first light source via the first pinhole.

14. The method of claim 13, wherein the first inspection process is the transmittance imaging process and the second inspection process is a white light imaging process.

15. The method of claim 13, wherein the rotating stage is adapted to rotate at a rotation angle step of $2\pi/m(n+1)$, wherein m is the number of gemstones on the sample stage, and n is the number of types of the plurality of indicators.

16. The method of claim 13, wherein the inspection apparatus further comprises a camera adapted to capture an image of the gemstone; wherein the step of using a first light source of the inspection apparatus or the step of using the second light source further comprises a light intensity optimization step based on the image captured by the camera.

17. The method of claim 16, wherein the light intensity optimization step further comprises:

turning a light intensity from the first light source in the case of using the first light source of the inspection apparatus to conduct the first inspection process to the gemstone, or from the second light source in the case of using the second light source to conduct the second inspection process to the gemstone, to a maximum value; and adjusting the light intensity to an optimized value based on an image intensity of the image captured by the camera.

18. The method of claim 13, wherein the plurality of indicators are made from UV fluorescence dye.

\* \* \* \* \*